United States Patent
Hirai

(10) Patent No.: US 9,215,356 B2
(45) Date of Patent: Dec. 15, 2015

(54) IMAGE PROCESSING APPARATUS, IMAGE PROCESSING METHOD, AND PROGRAM TO COMBINE A COMPOSITE IMAGE OF NOISE SUPPRESSED IMAGES GENERATED FROM IMAGES EACH INCLUDING A DIRECT CURRENT COMPONENT AND AT LEAST ONE NOISE SUPPRESED IMAGE PROCESSED FROM AT LEAST ONE IMAGE NOT INCLUDING THE DIRECT CURRENT COMPONENT

(71) Applicant: CANON KABUSHIKI KAISHA, Tokyo (JP)

(72) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 111 days.

(21) Appl. No.: 13/947,853

(22) Filed: Jul. 22, 2013

(65) Prior Publication Data

US 2014/0022419 A1 Jan. 23, 2014

(30) Foreign Application Priority Data

Jul. 23, 2012 (JP) ................................ 2012-163027

(51) Int. Cl.
 *H04N 5/217* (2011.01)
 *H04N 5/232* (2006.01)
(52) U.S. Cl.
 CPC ........... *H04N 5/217* (2013.01); *H04N 5/23229* (2013.01)

(58) Field of Classification Search
 CPC ...... H04N 5/361; H04N 5/3575; H04N 5/378; H04N 9/045; G06T 5/001
 USPC ......................................................... 348/241
 See application file for complete search history.

(56) References Cited

U.S. PATENT DOCUMENTS

2011/0199542 A1* 8/2011 Hirai .............................. 348/624
2012/0105671 A1* 5/2012 Taniguchi et al. .......... 348/224.1

FOREIGN PATENT DOCUMENTS

JP 2008-15741 A 1/2008
JP 2009-199104 A 9/2009

* cited by examiner

*Primary Examiner* — Twyler Haskins
*Assistant Examiner* — Fayez Bhuiyan
(74) *Attorney, Agent, or Firm* — Canon USA, Inc., IP Division

(57) ABSTRACT

The present invention provides an image processing apparatus that increases an effect of noise suppression processing and allows a visually excellent image to be obtained. This image processing apparatus divides an input image into bands to generate a high frequency image that does not include a direct current component. The image processing apparatus further generates reduced images each including the direct current component and having a different resolution from an image including the direct current component, and performs noise suppression processing on the high frequency image and the reduced images. The image processing apparatus then repeats enlargement and combining of the reduced images and adds a composite image and the high frequency image to finally obtain an output image.

8 Claims, 9 Drawing Sheets

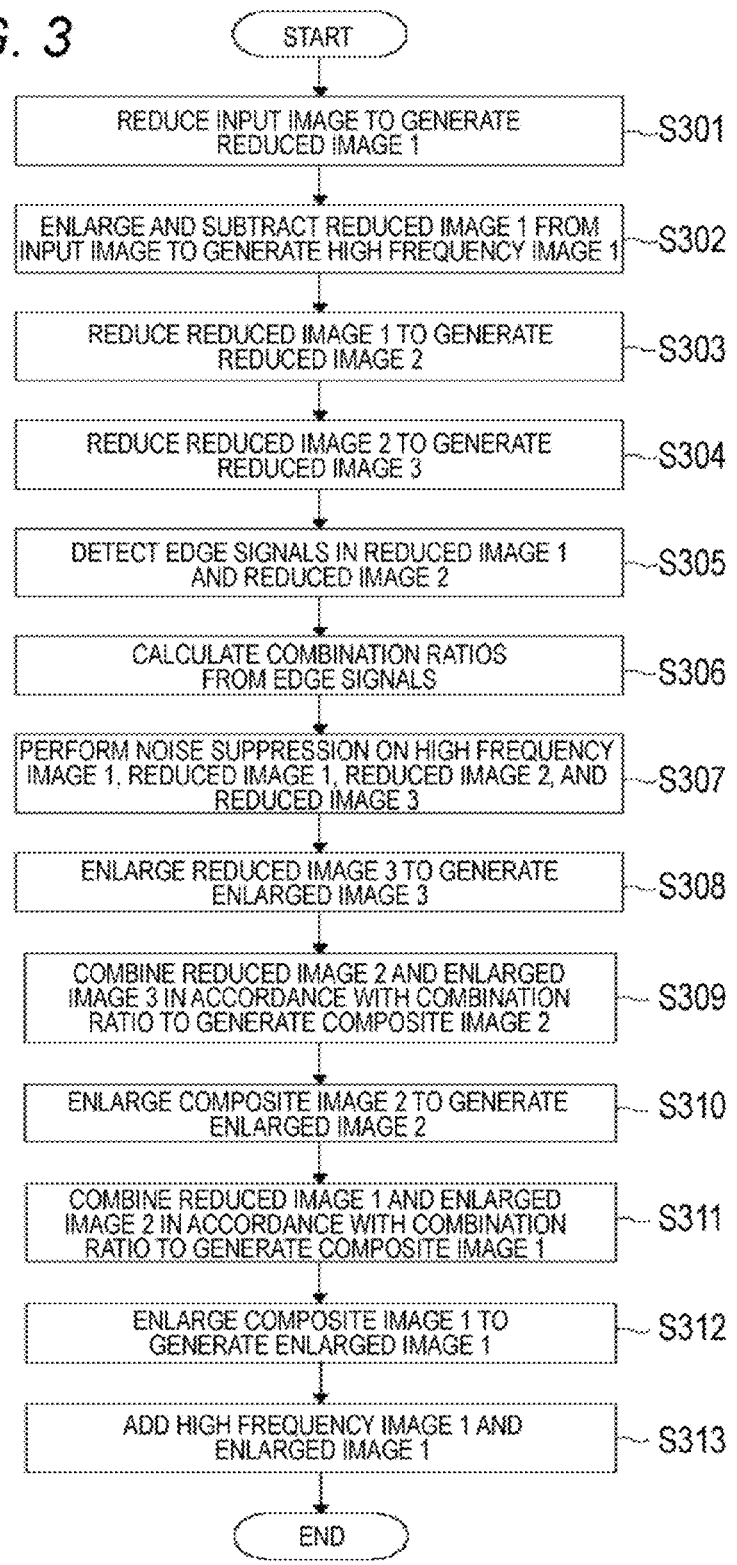

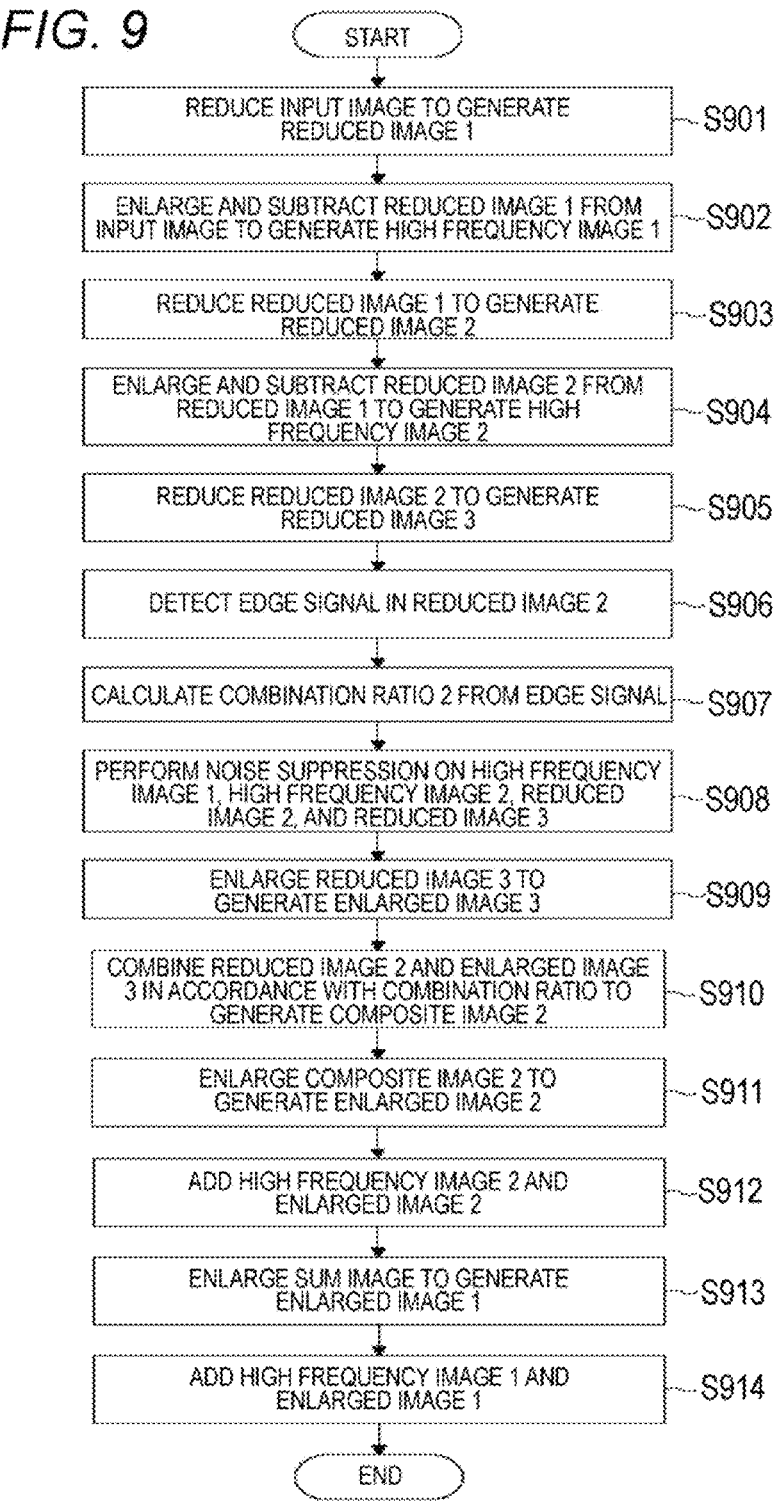

FIG. 10A
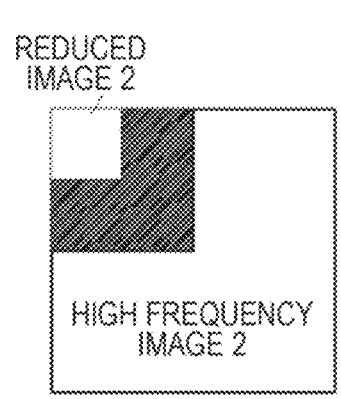
FIG. 10B
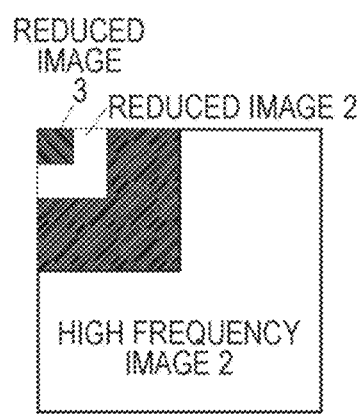
FIG. 11
(PRIOR ART)
| LLL | LHL | HL |
|---|---|---|
| (LL) | | |
| LLM | LHH | |
| LH | | HH |

IMAGE PROCESSING APPARATUS, IMAGE PROCESSING METHOD, AND PROGRAM TO COMBINE A COMPOSITE IMAGE OF NOISE SUPPRESSED IMAGES GENERATED FROM IMAGES EACH INCLUDING A DIRECT CURRENT COMPONENT AND AT LEAST ONE NOISE SUPPRESED IMAGE PROCESSED FROM AT LEAST ONE IMAGE NOT INCLUDING THE DIRECT CURRENT COMPONENT

BACKGROUND OF THE INVENTION

1. Field of the Invention

The present invention relates to an image processing apparatus, an image processing method, and a program that are suitable for use for suppressing noise.

2. Description of the Related Art

In recent years, there has been a growing trend toward smaller pixels for image sensors, which has entailed a tendency toward increased noises in image signals obtained from an image sensor. As a solution to this, there are known approaches through signal processing, in which multirate signal processing is used to suppress the noises.

Japanese Patent Application Laid-Open No. 2008-15741, for example, discloses a technique in which an image signal is divided into a plurality of frequency components, and noises are suppressed in each divided image before recombining. For example, an image signal is divided for each frequency band as illustrated in FIG. 11, and noise suppression processing is performed on each divided image. Various dividing methods are available to obtain the frequency components. To generate a low frequency image, for example, a prefilter is applied to an original image to thin its size to a half. To generate a high frequency image, a low frequency image is enlarged such that its size is similar to that of the original image, and then the image subjected to the enlargement processing is subtracted from the original image.

Through the division into the frequency components as described above, the noise suppression can be set by an application amount suitable for the frequency component of each divided image. In addition, the reduction in size of each image allows the noise reduction with a short filter length. Note that high frequency noises are inconspicuous visually due to a finer granularity of the noise. Conversely, low frequency noises are conspicuous visually due to a rougher granularity. Hence, it is desirable that the low frequency noises are removed by a larger amount than the high frequency noises.

In addition, it is possible to perform processing of combining divided images, which have been divided into the frequency components, with a simple calculation of adding an enlarged low frequency image to a high frequency image. As it is apparent from the calculation method for the combining processing, though, when a divided image suffers a blur due to the noise suppression processing, an image obtained after the combining processing also suffers a blur remaining in a corresponding frequency band. The method of noise suppression through the division into frequency bands is problematic in that, even though this method allows noise suppression by a different amount for each frequency band, the effect of the noise suppression should be restrained such that a blur is tolerable in each frequency band.

In light of this, another noise suppression technique is disclosed in Japanese Patent Application Laid-Open No. 2009-199104. In this technique, a plurality of reduced images is generated from an image signal, and, then, the noise suppression processing is performed on the plurality of reduced images. Also, an edge signal is extracted to obtain, for each image, a combination ratio based on the edge signal. The plurality of image signals is then combined on the basis of the combination ratio.

As illustrated in FIG. 12, for example, an image reduced to a ½ size and an image reduced to a ¼ size in both a horizontal direction and a vertical direction are generated. The noise suppression processing is then performed on each image, and an edge signal is extracted. To combine the images, a combination ratio is decided on the basis of the edge signal, such that a larger sized image is used for a portion with a strong edge signal and an image, which has been reduced and then enlarged to an original size, is used for a portion with a weak edge signal.

For edge portions of an image obtained after the combining, the arrangement as described above allows a greater use of original-sized images, while not using reduced images as much. Hence, even when an application of the noise suppression processing to a reduced image results in a blur of an edge portion, the blur does not affect the last image. This allows a stronger application of the noise suppression to a reduced image, which enables an image to be obtained with an increased effect of the noise suppression in low frequency components without causing a blur in the image obtained after the combining.

The combination ratio, however, is calculated from an edge detected in an image. Hence, as illustrated in FIG. 13A, for example, noises that are overlaid on the image may obscure an edge, thereby interfering with the combination ratio. In other words, when the combination ratio varies in a continuous edge, a high resolution image is used for a portion with a high combination ratio, while a low resolution image is used for a portion with a low combination ratio. This may result in a problem that the edge in an image obtained after the combining may appear discontinuous as illustrated in FIG. 13B or the edge may vary in thickness in an unstable manner, leading to a degradation in image quality. Note that the image quality degradation occurred during the combining has a propensity for visual conspicuousness if it is caused in a portion with a relatively high resolution.

As described above, the technique of dividing an image per frequency and suppressing noises in each image presents a problem that it is difficult to produce a full effect of the noise suppression. The technique of generating a plurality of reduced images to suppress noises in each image and combining the images using edge signals presents a problem that the edge signals are affected by the noises, resulting in obscureness in a composite image.

SUMMARY OF THE INVENTION

According to an aspect of the present invention, there is provided an image processing apparatus, including: a first image generating unit configured to divide an input image into bands to generate an image that includes a direct current component and at least one image that does not include the direct current component; a second image generating unit configured to generate a plurality of images from the image that has been generated by the first image generating unit and includes the direct current component, the images each including the direct current component and having a different resolution; a noise suppressing unit configured to perform noise suppression processing on the images generated by the first image generating unit and on the images generated by the second image generating unit; a first combining unit configured to combine the plurality of images generated by the second image generating unit and subjected to the noise suppression processing; and a second combining unit configured to combine a composite image from the first combining unit and the at least one image that does not include the direct current component and has been subjected to the noise suppression processing.

Further features of the present invention will become apparent from the following description of exemplary embodiments (with reference to the attached drawings).

BRIEF DESCRIPTION OF THE DRAWINGS

FIG. 3 is a flowchart of an exemplary processing procedure by the band-based noise suppression processing section according to the first embodiment;

FIG. 9 is a flowchart of an exemplary processing procedure by the band-based noise suppression processing section according to the second embodiment;

FIG. 10A is a diagram for describing frequency components of an input image, a high frequency image 1, a high frequency image 2, and a reduced image 2 according to the second embodiment;

FIG. 10B is a diagram for describing a frequency component of a reduced image 3 according to the second embodiment;

FIG. 11 is a diagram for describing an image conventionally divided for each frequency band;

DESCRIPTION OF THE EMBODIMENTS

First Embodiment

A first embodiment of the present invention will now be described with reference to the drawings.

Figure 1:
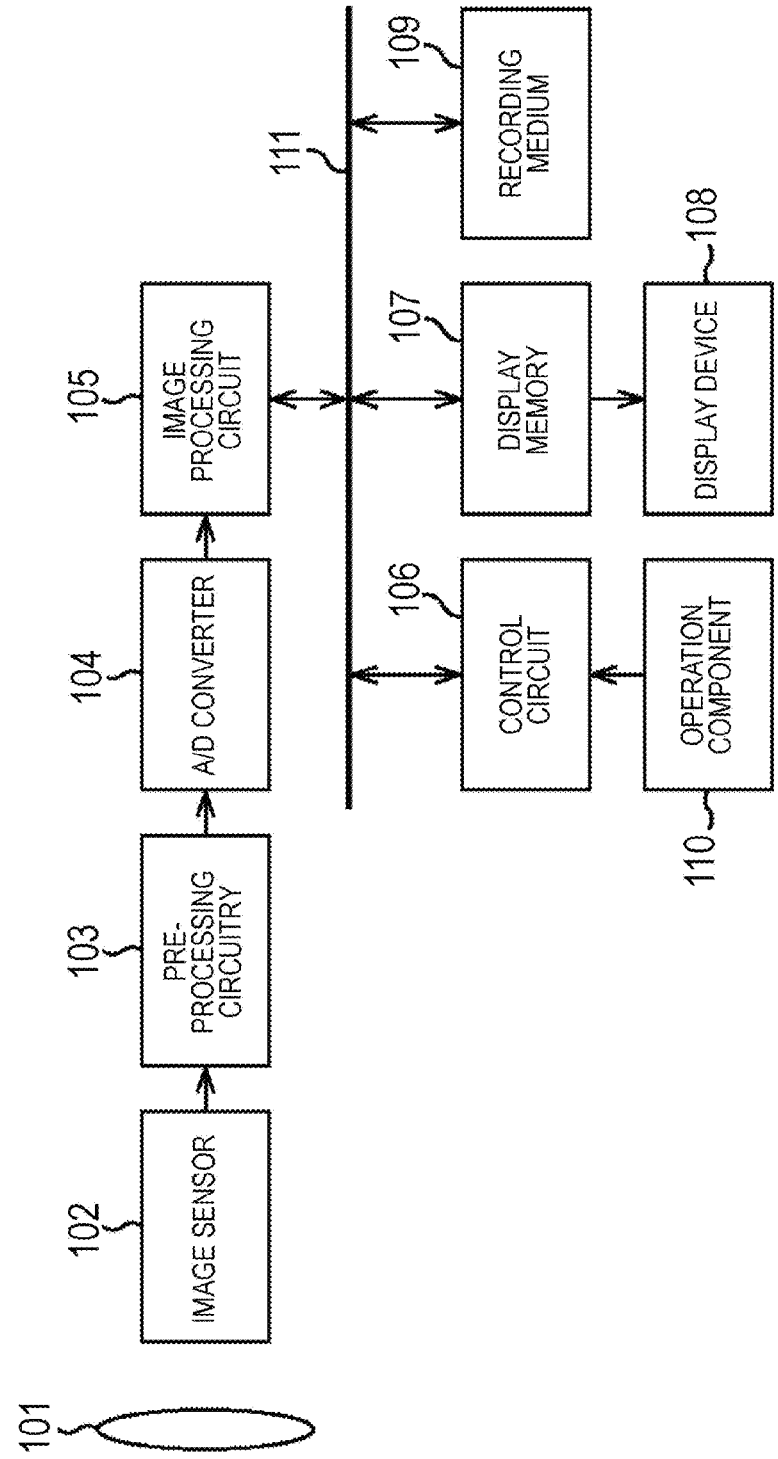
FIG. 1 is a block diagram of an exemplary schematic arrangement of a digital camera according to some embodiments of the present invention.

FIG. 1 is a block diagram of an exemplary schematic arrangement of a digital camera 100 according to the present embodiment. Note that the device is not limited to a digital camera. The present embodiment can be carried out with another device such as a digital video camera and a personal computer as long as the device can perform image processing on an image signal.

In FIG. 1, an optical module 101 includes a lens group including a zoom lens and a focus lens, an aperture device, and a shutter device. The optical module 101 adjusts a magnification, an in-focus position, and a light amount of a subject image reaching an image sensor 102. The image sensor 102 is a photoelectric conversion element, such as a CCD (charge coupled device) and a CMOS (complementary metal oxide semiconductor) sensor, for converting the subject image to electrical signals to generate image signals. In the present embodiment, the image sensor 102 is constituted by a CCD.

Pre-processing circuitry 103 includes a CDS (correlated double sampling) circuit and an amplifier circuit. The CDS circuit suppresses a dark current included in an image signal generated by the image sensor 102. The amplifier circuit amplifies the image signal output from the CDS circuit. An A/D converter 104 converts the image signal output from the pre-processing circuitry 103 to a digital image signal.

An image processing circuit 105 performs processing, such as white balance processing, noise suppression processing, tone conversion processing, and edge emphasis correction processing, on the image signal and outputs the image signal as a luminance signal Y and color difference signals U and V. The image processing circuit 105 also calculates, from the image signal, a luminance value of a subject and an in-focus value that represents a focus state of the subject. Note that the image processing circuit 105 can perform similar image processing on an image signal read out from a recording medium 109 besides an image signal output from the A/D converter 104.

A control circuit 106 controls each circuit constituting the digital camera 100 according to the present embodiment to provide centralized control over the operation of the digital camera 100. The control circuit 106 also drives and controls the optical module 101 and the image sensor 102 on the basis of the luminance value obtained from the image signal processed by the image processing circuit 105 and an instruction input from an operation component 110.

A display memory 107 is a memory for temporarily storing the image signal that is a basis for an image to be displayed by a display device 108. The display device 108 is constituted by a liquid crystal display or an organic EL (electro luminescence) display, and displays an image relating to the image signal generated by the image sensor 102 and the image signal read out from the recording medium 109. The display device 108 can function as an electronic viewfinder by updating and displaying, as needed, successive image signals read out from the image sensor 102. The display device 108 can also display a state of the digital camera 100, text information including a shutter speed, an aperture value, and sensitivity information decided by a user or the digital camera 100, and a graph indicating a luminance distribution measured by the image processing circuit 105.

The recording medium 109 may be detachable from the digital camera 100 or integrated in the digital camera 100. The operation component 110 is a component to be operated by the user to send an instruction to the digital camera 100. A bus 111 is used for passing the image signal between the image processing circuit 105, the control circuit 106, the display memory 107, and the recording medium 109.

An exemplary operation, during photographing, of the digital camera 100 according to the present embodiment will now be described. Upon operation of the operation component 110 by the user to input an instruction to start a preparation for capturing an image, the control circuit 106 starts controlling the operation of each circuit.

The image sensor 102 photoelectrically converts the subject image that has passed through the optical module 101 to generate an analog image signal. The A/D converter 104 digitizes the analog image signal that has been processed by the pre-processing circuitry 103. The image processing circuit 105 performs processing, such as the white balance processing, the noise suppression processing, the tone conversion processing, and an outline correction processing, on the image signal output from the A/D converter 104.

The image signal that has been processed by the image processing circuit 105 passes through the display memory 107 to be displayed as an image by the display device 108. As described above, the display device 108 functions as an electronic viewfinder by updating in real time and displaying on the display device 108 an image of the subject, using image signals successively generated by the image sensor 102 for readout of the successive image signals.

The processing described above is repeated until the user operates a shutter button included in the operation component 110. Upon operation of the shutter button by the user, the control circuit 106 readjusts the operation of the optical module 101, on the basis of a luminance value and an in-focus value obtained by the image processing circuit 105, to capture a still image. The image processing circuit 105 performs various types of image processing including the noise suppression processing on an image signal of the still image. The image signal output from the image processing circuit 105 is then recorded in the recording medium 109.

Figure 2:
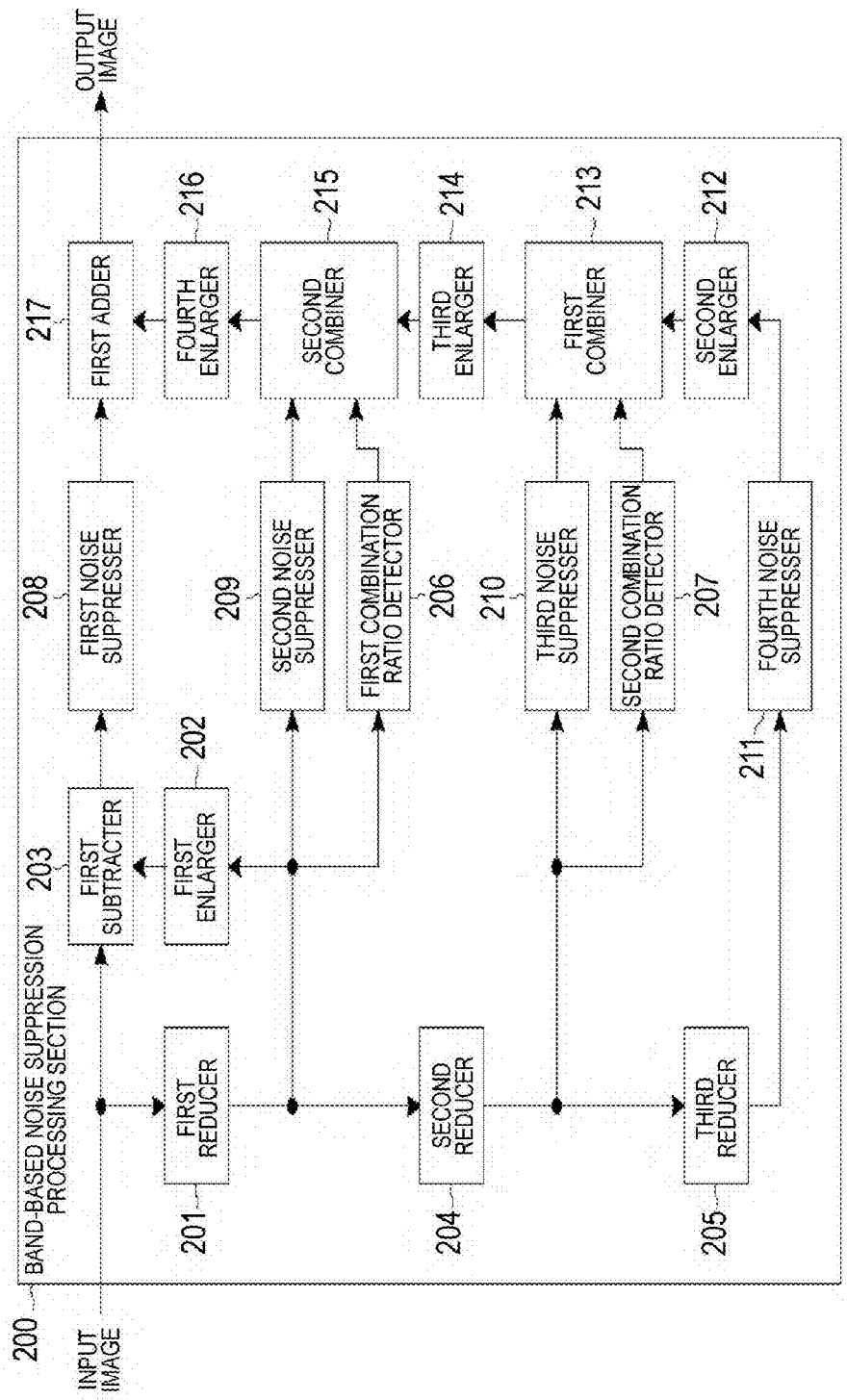
FIG. 2 is a block diagram of an exemplary arrangement in detail of a band-based noise suppression processing section included in an image processing circuit according to a first embodiment.

The noise suppression processing in the image processing circuit 105 will now be described in detail. FIG. 2 is a block diagram of an exemplary arrangement in detail of a band-based noise suppression processing section 200 included in the image processing circuit 105.

The band-based noise suppression processing section 200 according to the present embodiment includes a first reducer 201, a second reducer 204, a third reducer 205, a first enlarger 202, a second enlarger 212, a third enlarger 214, a fourth enlarger 216, and a first subtracter 203. The band-based noise suppression processing section 200 further includes a first combination ratio detector 206, a second combination ratio detector 207, a first noise suppresser 208, a second noise suppresser 209, a third noise suppresser 210, a fourth noise suppresser 211, a first combiner 213, a second combiner 215, and a first adder 217.

FIG. 3 is a flowchart of an exemplary processing procedure by the band-based noise suppression processing section 200. Upon receiving an image signal output from the A/D converter 104, the image processing circuit 105 performs, after pixel color interpolation processing, processing illustrated in FIG. 3 for each color at the band-based noise suppression processing section 200. Note that a description of processing, such as the white balance processing, color conversion processing, and the tone conversion processing, is omitted.

Figure 4A:
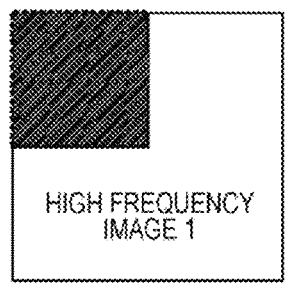
FIG. 4A is a diagram for describing frequency components of an input image, a high frequency image, and a reduced image 1 according to the first embodiment.
Figure 4B:
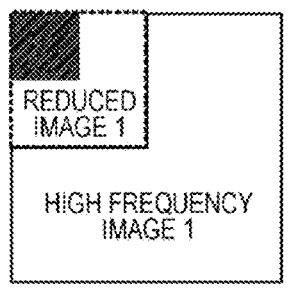
FIG. 4B is a diagram for describing a frequency component of a reduced image 2 according to the first embodiment.
Figure 4C:
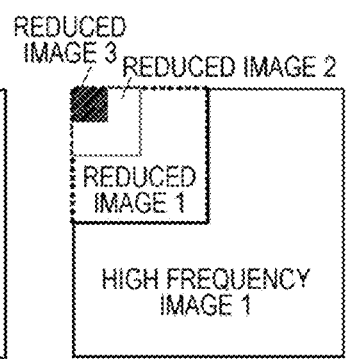
FIG. 4C is a diagram for describing a frequency component of a reduced image 3 according to the first embodiment.

In step S301, the first reducer 201 applies a prefilter to an input image signal to generate a reduced image 1 that is obtained by thinning a pixel to a ½ size in both a horizontal direction and a vertical direction. As the prefilter, a factor of [1 2 1] is used in both the horizontal direction and the vertical direction. This averaging factor sets a weighting for a pixel of interest and a weighting for each pixel adjacent to the pixel of interest on either side thereof to a ratio of 2 to 1. Here, FIGS. 4A to 4C are diagrams of a band concept in a frequency space of an image. In FIGS. 4A to 4C each, an outermost square represents a frequency space of an input image signal. In this frequency space, a higher frequency component is obtained toward the bottom of the square in the vertical direction and toward the right side of the square in the horizontal direction. Note that a direct current component corresponds to the top left edge of this frequency space. A shaded area illustrated in FIG. 4A represents frequency components, including the direct current component, of the reduced image 1. It is understood from FIG. 4A that the reduced image 1 includes, in the vertical direction and the horizontal direction, frequency components that are among frequency components included in the input image signal and are not more than a threshold. This threshold is referred to as a first threshold.

Then, in step S302, the first enlarger 202 enlarges the reduced image 1, which has been generated, to a similar size to the input image signal through bilinear interpolation. The first subtracter 203, then, subtracts the enlarged image from the input image signal for each pixel to generate a high frequency image 1 that does not include the direct current component. Frequency components included in this high frequency image 1 have been obtained by excluding the frequency components that are included in the reduced image 1 from the frequency components that are included in the input image signal. Thus, the frequency components included in the high frequency image 1 merely include frequency components that are more than the first threshold. In other words, an area outside the shaded area illustrated in FIG. 4A indicates the frequency components of the high frequency image 1. As described above, the first reducer 201, the first enlarger 202, and the first subtracter 203 function as a first image generating unit.

Then, in step S303, the second reducer 204 uses the reduced image 1 to generate a reduced image 2 that is obtained by reducing the reduced image 1 to a ½ size in both the horizontal direction and the vertical direction. Processing by the second reducer 204 is basically similar to that of the first reducer 201. A shaded area illustrated in FIG. 4B indicates frequency components of the reduced image 2. It is understood from FIG. 4B that the reduced image 2 includes, in the vertical direction and the horizontal direction, frequency components that are among the frequency components included in the reduced image 1 and are not more than a second threshold that is less than the first threshold. Here, the reduced image 1 and the reduced image 2 have a commonality in that they both include frequency components not more than the second threshold.

Then, in step S304, the third reducer 205 uses the reduced image 2 to generate a reduced image 3 that is obtained by reducing the reduced image 2 to a ½ size in both the horizontal direction and the vertical direction. Note that processing by the third reducer 205 is also similar to that of the first reducer 201. A shaded area illustrated in FIG. 4C indicates frequency components of the reduced image 3. It is understood from FIG. 4C that the reduced image 3 includes, in the vertical direction and the horizontal direction, frequency components that are among the frequency components included in the reduced image 2 and are not more than a third threshold that is less than the second threshold. Here, the reduced image 2 and the reduced image 3 have a commonality in that they both include frequency components not more than the third threshold. As described above, the first reducer 201, the second reducer 204, and the third reducer 205 function as a second image generating unit.

Then, in step S305, the first combination ratio detector 206 applies to the reduced image 1 a Laplacian filter described hereinafter as Expression 1 to detect an edge signal. Similarly, the second combination ratio detector 207 applies the Laplacian filter to the reduced image 2 to detect an edge signal.

[Expression 1]

$$\begin{pmatrix} -1 & -1 & -1 \\ -1 & 8 & -1 \\ -1 & -1 & -1 \end{pmatrix} \quad (1)$$

Figure 5:
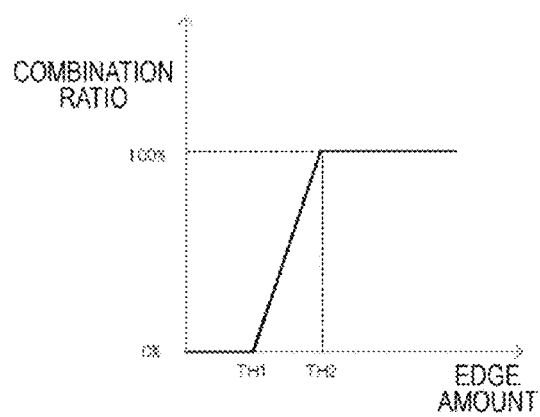
FIG. 5 is a diagram of an exemplary relationship between an edge amount and a combination ratio.

Then, in step S306, the first combination ratio detector 206 calculates a combination ratio from the detected edge signal in accordance with a relationship illustrated in FIG. 5. Similarly, the second combination ratio detector 207 calculates the combination ratio. That is, an absolute value of the edge signal is obtained to produce an edge amount, and the edge amount is compared against thresholds TH 1 and TH 2. If the edge amount is less than the threshold TH 1, the combination ratio is set to 0% for an image that is one of the two images to be combined and includes a frequency component with a higher upper limit. If the edge amount is more than the threshold TH 2, the combination ratio is set to 100% for the image. The combination ratio is calculated linearly between the thresholds TH 1 and TH 2. Note that it is desirable that the thresholds TH 1 and TH 2 be changed for the edge amount detected by the first combination ratio detector 206 and for the edge amount detected by the second combination ratio detector 207.

Then, in step S307, the first noise suppresser 208 performs the noise suppression processing on the high frequency image 1. Similarly, the second noise suppresser 209 performs the noise suppression processing on the reduced image 1, the third noise suppresser 210 performs the noise suppression processing on the reduced image 2, and the fourth noise suppresser 211 performs the noise suppression processing on the reduced image 3.

Figure 6:
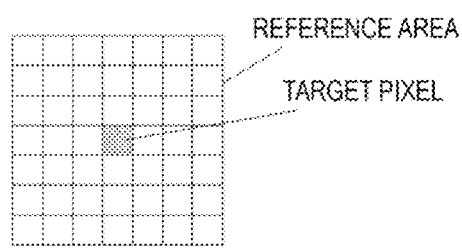
FIG. 6 is a diagram of a target pixel and a reference area.

During the noise suppression processing, as illustrated in FIG. 6, a reference area of, for example, 7×7 pixels is set around a target pixel, and a difference of each pixel in the reference area from the target pixel is obtained. A mean value is then calculated using pixels with the differences within a threshold. The mean value is output as a value of the target pixel. By performing the processing described above on each pixel, an output image is obtained in which noises are suppressed over the entire image. It is desirable that the threshold be changed for each image. Furthermore, the threshold may be changed depending on a signal level in consideration of the sensor's light shot noise.

In addition, it is desirable that the threshold be set such that an effect of the noise suppression on the high frequency image 1 does not cause a degradation of resolution and that the effect of the noise suppression on the reduced images 1 to 3 having different resolutions is somewhat strong. For example, the threshold set during the noise suppression processing on the reduced images 1 to 3 may be smaller than the threshold set during the noise suppression processing on the high frequency image 1. In addition, the noise suppression processing on the high frequency image 1, the reduced image 1, the reduced image 2, and the reduced image 3 is performed in a similar manner in the present embodiment. Alternatively, the noise suppression may be performed in different manners based on the images.

Then, in step S308, the second enlarger 212 enlarges the reduced image 3, after the noise suppression, to generate an enlarged image 3, such that the number of pixels of the enlarged image 3 is identical to that of the reduced image 2. Here, processing of the second enlarger 212 is similar to that of the first enlarger 202.

Then, in step S309, the first combiner 213 combines the reduced image 2 and the enlarged image 3 to generate a composite image 2. During the combining processing, weighted addition is performed for each pixel depending on the combination ratio calculated by the second combination ratio detector 207 to generate the composite image 2. The reduced image 2 has a high frequency characteristic in comparison with the enlarged image 3, and, thus, the combination ratio enables the reduced image 2 to be used at portions with a larger edge amount and the enlarged image 3 to be used at portions with a smaller edge amount. This allows enhancement of the noise suppression effect while preserving a higher frequency characteristic.

Then, in step S310, the third enlarger 214 enlarges the composite image 2, which has been generated, to generate an enlarged image 2, such that the number of pixels of the enlarged image 2 is identical to that of the reduced image 1. Processing of the third enlarger 214 is also similar to that of the first enlarger 202.

Then, in step S311, the second combiner 215 combines the reduced image 1 and the enlarged image 2 to generate a composite image 1. During the combining processing, the weighted addition is performed for each pixel depending on the combination ratio calculated by the first combination ratio detector 206 to generate the composite image 1. The reduced image 1 has a high frequency characteristic in comparison with the enlarged image 2, and, thus, the combination ratio enables the reduced image 1 to be used at portions with a larger edge amount and the enlarged image 2 to be used at portions with a smaller edge amount. This allows enhancement of the noise suppression effect while preserving the higher frequency characteristic. As described above, the first combiner 213 and the second combiner 215 functions as a first combining unit.

Then, in step S312, the fourth enlarger 216 enlarges the composite image 1, which has been generated, to generate an enlarged image 1, such that the number of pixels of the enlarged image 1 is identical to that of the high frequency image 1. Processing of the fourth enlarger 216 is also similar to that of the first enlarger 202.

Then, in step S313, the first adder 217, which functions as a second combining unit, adds the high frequency image 1 and the enlarged image 1, which have been subjected to the noise suppression, for each pixel to obtain an output image. The high frequency image 1 and the enlarged image 1 are added without further processing irrespectively of the edge amount. Hence, an image quality degradation due to a variation of the combination ratio, such as those caused at the first combiner 213 and the second combiner 215, does not occur.

As described above, according to the present embodiment, a variation of the combination ratio caused during the combining based on an edge signal including noises may lead to degradation in the image quality in a low frequency area but not in a high frequency area. Thus, the degradation in the image quality is visually inconspicuous. In addition, the noise suppression effect can be enhanced in the low frequency area, thereby reducing the noise with a large granularity effectively.

Second Embodiment

A second embodiment of the present invention will now be described. In the present embodiment, a method for changing the band division method depending on a photographing condition, in particular, a sensitivity for photographing, will be described. A change in the photographing sensitivity changes an amount of noises overlaid on an image. A relatively low sensitivity involves a small noise amount, and, thus, the variation of the combination ratio due to the noise, which has been described in the first embodiment, is small, leading to a small degree of the image quality degradation. Conversely, a relatively high sensitivity involves a large noise amount, and, thus, the variation of the combination ratio due to the noise is large. In light of this, in the present embodiment, the method of the band division is changed for a low sensitivity and a high sensitivity. That is, the number of reduced images and the number of high frequency images are changed. In particular, the method will be described for performing optimal noise suppression depending on the sensitivity by reducing an effect of the variation of the combination ratio for the high sensitivity.

Note that an overall arrangement of a digital camera according to the present embodiment is similar to that of the first embodiment, and a description of commonalities will not be repeated. A difference lies in an image processing circuit 105, which includes two sections, namely a band-based noise suppression processing section 200 illustrated in FIG. 2 and a band-based noise suppression processing section 800 to be described with reference to FIG. 8.

Figure 7:
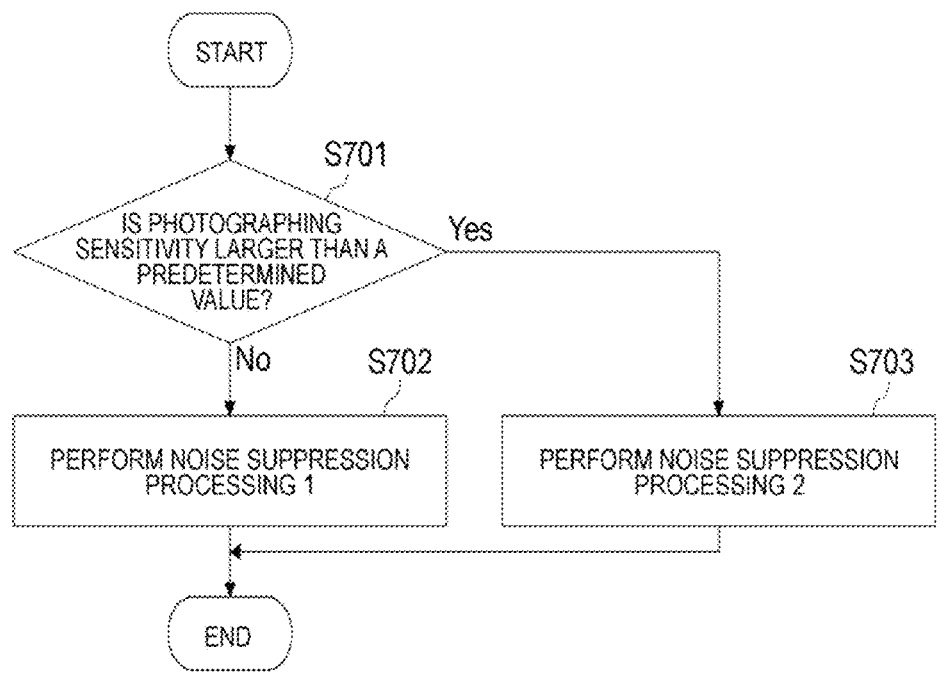
FIG. 7 is a flowchart of an exemplary processing procedure according to a second embodiment for selecting noise suppression processing depending on a sensitivity.

FIG. 7 is a flowchart of an exemplary processing procedure for deciding on noise suppression processing depending on the sensitivity.

In step S701, it is determined whether the photographing sensitivity is not less than a predetermined value. As a result of this determination, if the sensitivity is less than the predetermined value, the processing moves on to step S702, and if the sensitivity is not less than the predetermined value, the processing moves on to step S703.

In step S702, noise suppression processing 1 is performed by the band-based noise suppression processing section 200. During the noise suppression processing 1, an operation identical to that of the first embodiment is performed. In step S703, noise suppression processing 2 is performed by the band-based noise suppression processing section 800 illustrated in FIG. 8. An operation of the noise suppression processing 2 will now be described.

Figure 8:
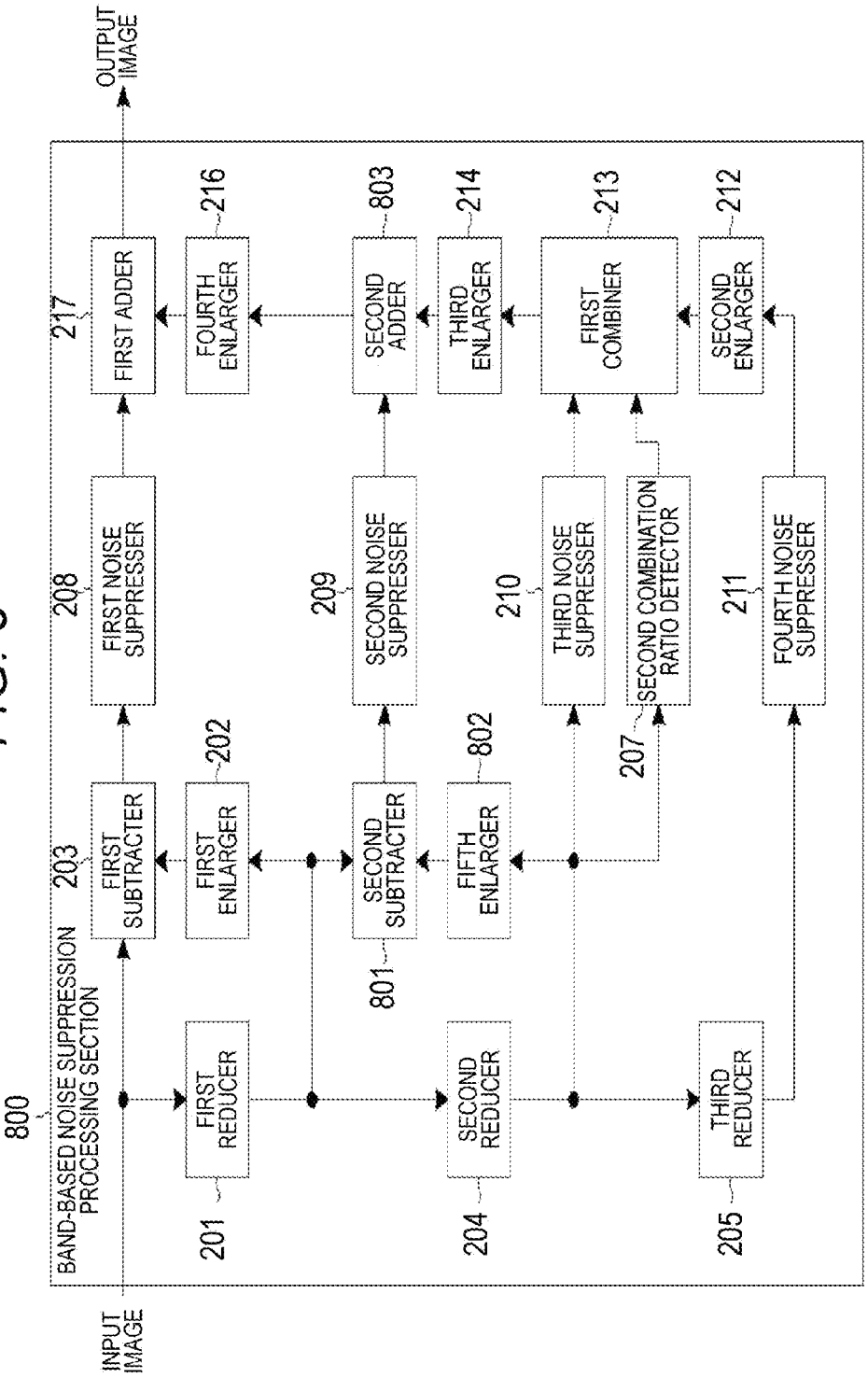
FIG. 8 is a block diagram of an exemplary arrangement in detail of a band-based noise suppression processing section included in an image processing circuit according to the second embodiment.
Figure 12:
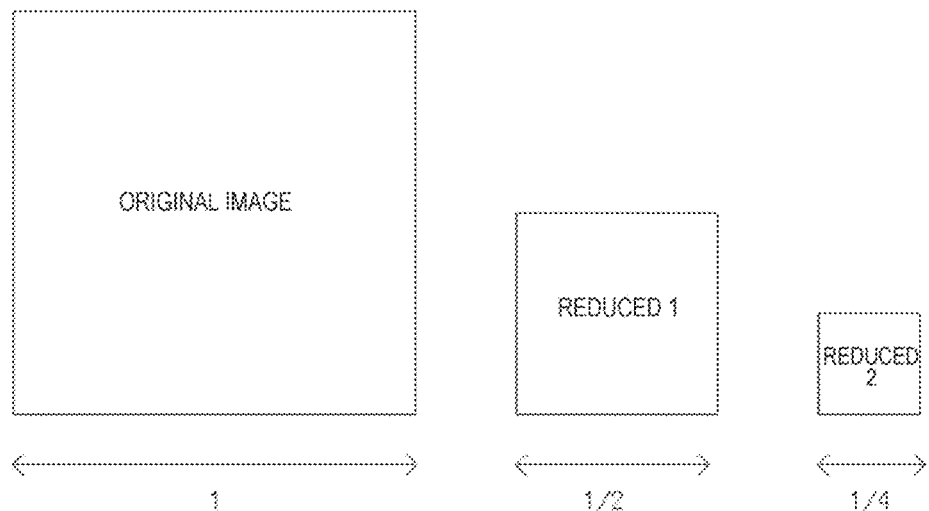
FIG. 12 is a diagram for describing an outline of generation of reduced images.
Figure 13A:
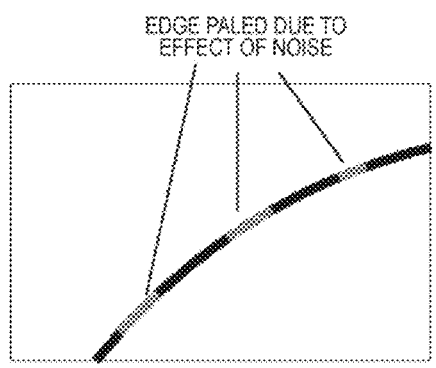
FIG. 13A is a diagram for describing an image including an obscured edge.
Figure 13B:
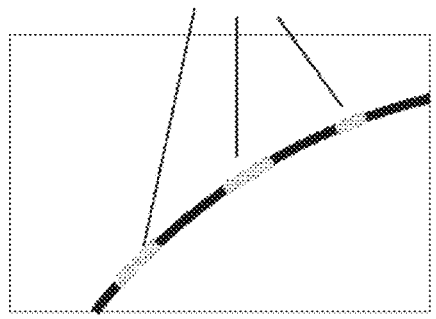
FIG. 13B is a diagram for describing an image obtained after combining in a case where the obscured edge is included.

The band-based noise suppression processing section 800 illustrated in FIG. 8 is a partial modification of the band-based noise suppression processing section 200 illustrated in FIG. 2. Identical numerals are used to indicate circuits that perform similar operations.

With reference to the flowchart illustrated in FIG. 9, an operation of the band-based noise suppression processing section 800 illustrated in FIG. 8 will be described. Processing from step S901 to step S903 is similar to that from step S301 to step S303 illustrated in FIG. 3.

Then, in step S904, a fifth enlarger 802 enlarges a reduced image 2 to a double size. Then, a second subtracter 801 subtracts the reduced image 2, which has been enlarged, from a reduced image 1 to generate a high frequency image 2 that does not include a direct current component. A frequency component of the high frequency image 2 is illustrated in a shaded area illustrated in FIG. 10A. A difference from the first embodiment is that the high frequency image 2 does not include the direct current component, which is present in the reduced image 1 illustrated in FIG. 4A. Note that the fifth enlarger 802 is of a similar arrangement to the first enlarger 202. The second subtracter 801 is of a similar arrangement to the first subtracter 203.

Then, in step S905, similarly to step S304 in FIG. 3, a reduced image 3 is generated. A frequency component of the reduced image 3 is illustrated in FIG. 10B.

Then, in step S906, a second combination ratio detector 207 applies to a reduced image 2 a Laplacian filter described in Expression 1 to detect an edge signal. Then, in step S907, the second combination ratio detector 207 calculates the combination ratio from the detected edge signal in accordance with the relationship illustrated in FIG. 5.

Then, in step S908, similarly to step S307 illustrated in FIG. 3, the noise suppression processing is performed. Here, the second noise suppresser 209 performs the noise suppression processing on the high frequency image 2. Processing from step S909 to step S911 is similar to that from step S308 to step S310 illustrated in FIG. 3.

Then, in step S912, a second adder 803 adds the high frequency image 2 and an enlarged image 2, which have been subjected to the noise processing, to generate a sum image. Then, in step S913, a fourth enlarger 216 enlarges the sum image to generate an enlarged image 1. Then, in step S914, the first adder 217 adds the high frequency image 1 and the enlarged image 1 to generate an output image.

The present embodiment is provided with two arrangements, namely the band-based noise suppression processing section 200 illustrated in FIG. 2 and the band-based noise suppression processing section 800 illustrated in FIG. 8. Alternatively, the differences between the band-based noise suppression processing section 200 and the band-based noise suppression processing section 800 may be added to the band-based noise suppression processing section 200 to provide a consolidated band-based noise suppression processing section such that processing can be controlled in accordance with the conditions of use.

As described above, according to the present embodiment, a similar effect to the first embodiment can be obtained for a low sensitivity, whereas for a high sensitivity, images combined on the basis of an edge signal have lower frequency bands, which enables the degradation in the image quality due to the variation of the combination ratio to be less prone to occur.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-163027, filed Jul. 23, 2012, which is hereby incorporated by reference herein in its entirety.

What is claimed is:

1. An image processing apparatus, comprising:
   a first image generating unit configured to divide an input image into bands to generate a first image that includes a direct current component and at least one second image that does not include the direct current component and includes a higher frequency component than a frequency component included in the first image;
   a second image generating unit configured to generate a plurality of third images from the first image, the third images each including the direct current component and having a different resolution;
   a noise suppressing unit configured to perform noise suppression processing on the at least one second image and the third images;
   a first combining unit configured to combine the plurality of third images generated by the second image generating unit and subjected to the noise suppression processing; and
   a second combining unit configured to combine a composite image from the first combining unit and the at least one second image that has been subjected to the noise suppression processing.

2. The image processing apparatus according to claim 1, further comprising
   a combination ratio calculating unit configured to calculate an edge amount from the third image that includes the direct current component to detect, for the first combining unit, a combination ratio based on the detected edge amount.

3. The image processing apparatus according to claim 2, wherein
   the second combining unit combines, irrespectively of the edge amount, the composite image from the first combining unit and the at least one second image that has been subjected to the noise suppression processing.

4. The image processing apparatus according to claim 1, wherein
   the noise suppressing unit performs the noise suppression processing to produce a different effect for the at least one second image and for the third images.

5. The image processing apparatus according to claim 1, wherein
   the first image generating unit and the second image generating unit change the number of images to generate depending on a photographing condition.

6. The image processing apparatus according to claim 5, the photographing condition is a sensitivity for photographing.

7. An image processing method, comprising:
   first image generating by dividing an input image into bands to generate a first image that includes a direct current component and at least one second image that does not include the direct current component and includes a higher frequency component than a frequency component included in the first image;
   second image generating by generating a plurality of third images from the first image, the third images each including the direct current component and having a different resolution;
   noise suppressing by performing noise suppression processing on the at least one second image and the third images;
   first combining by combining the plurality of third images generated by the second image generating and subjected to the noise suppression processing; and
   second combining by combining a composite image from the first combining and the at least one second image that has been subjected to the noise suppression processing.

8. A storage medium for storing a program to be executed by a computer of an image processing apparatus, the storage medium comprising a program code for executing:
   first image generating by dividing an input image into bands to generate a first image that includes a direct current component and at least one second image that does not include the direct current component and includes a higher frequency component than a frequency component included in the first image;
   second image generating by generating a plurality of third images from the first image, the third images each including the direct current component and having a different resolution;
   noise suppressing by performing noise suppression processing on the at least one second image and the third images;
   first combining by combining the plurality of third images generated by the second image generating and subjected to the noise suppression processing; and
   second combining by combining a composite image from the first combining and the at least one second image that has been subjected to the noise suppression processing.

* * * * *